Figure 1:
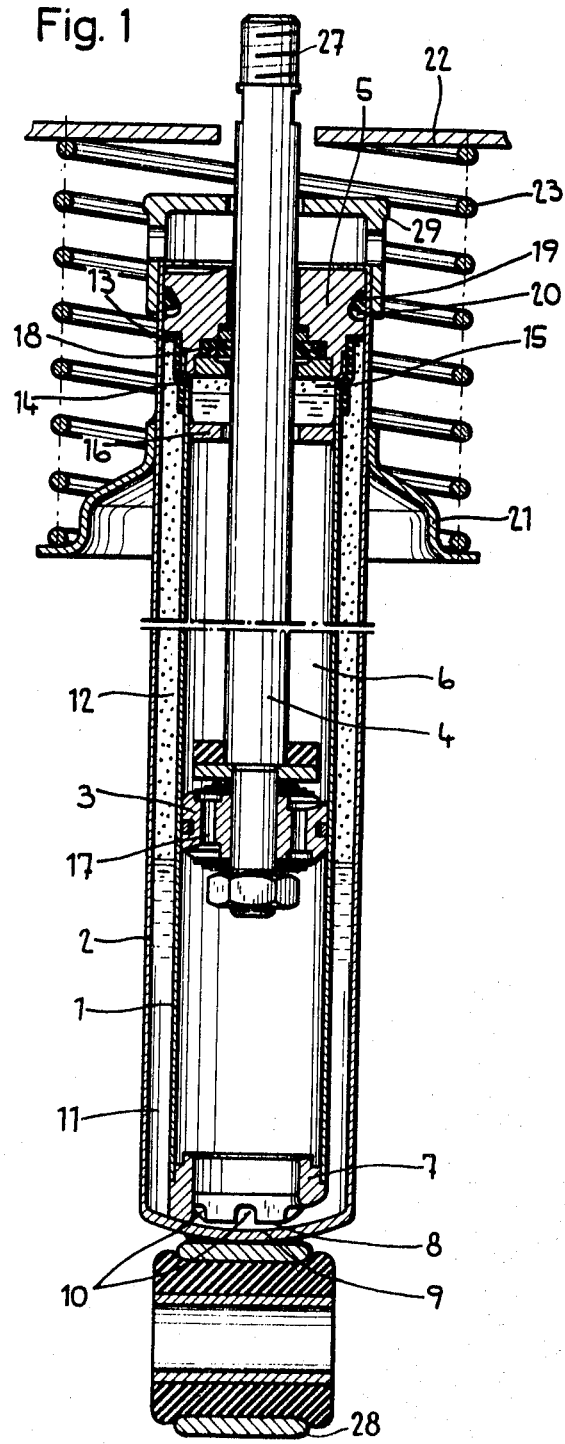

United States Patent

Wossner

[15] 3,661,236
[45] May 9, 1972

[54] HYDROPNEUMATIC SHOCK ABSORBER

[72] Inventor: Felix Wossner, Schweinfurt am Main, Germany

[73] Assignee: Fichtel & Sachs AG, Schweinfurt am Main, Germany

[22] Filed: Mar. 10, 1970

[21] Appl. No.: 18,229

[30] Foreign Application Priority Data

Mar. 13, 1969 Germany.................P 19 12 781.2

[52] U.S. Cl..............................188/315, 188/269, 188/322
[51] Int. Cl..........................F16f 9/06, F16f 9/34, F16f 9/40
[58] Field of Search..................................188/269, 315, 322

[56] References Cited

UNITED STATES PATENTS

| | | | |
|---|---|---|---|
| 3,520,384 | 7/1970 | Nicholls | 188/269 |
| 2,155,978 | 4/1939 | Oberstadt | 188/269 |
| 2,214,038 | 9/1940 | Beecher | 188/315 |
| 3,339,680 | 9/1967 | Tuneblom | 188/322 |

FOREIGN PATENTS OR APPLICATIONS 1,077,606  5/1954  France......................188/315

Primary Examiner—George E. A. Halvosa
Attorney—Kelman and Berman

[57] ABSTRACT

The cylinder of a shock absorber is spacedly enveloped by a coaxial, axially substantially coextensive cylindrical outer shell. A piston in the cylinder carries a piston rod which passes in sealing engagement through an annular first axial end wall of the cylinder and the shell. The cylinder cavity and the annular chamber between shell and cylinder are connected near the second imperforate axial end wall of the shock absorber which is below the annular wall in the normal operating position. A resilient sleeve in the chamber seals the cylinder to the first end wall and serves as a check valve on bore, in the cylinder for radially outward flow of gas. A compressed gas cushion occupies the upper portion of the chamber. The remainder of the chamber, the cylinder cavity, and axial throttling passages in the piston are filled with liquid. Gas reaching the cylinder cavity is quickly returned to the chamber through the check valve during operation of the shock absorber.

8 Claims, 3 Drawing Figures

PATENTED MAY 9 1972 3,661,236

INVENTOR.
Felix Wössner
By: Kelman and Berman
AGENTS.

HYDROPNEUMATIC SHOCK ABSORBER

This invention relates to shock absorbers, and particularly to an improvement in hydropneumatic shock absorbers.

In its more specific aspects, the invention is concerned with shock absorbers of the type having an outer shell and an inner cylinder elongated in a common direction, the cylinder having a longitudinal axis and being received in the shell so as to define a chamber therewith. The chamber and the cylinder cavity are axially bounded by a first annular end wall and a second imperforate end wall. A piston axially slidable in the cavity divides the same into two compartments and is formed with throttling passages connecting the compartments. A piston rod attached to the piston extends through one compartment and outward of the cylinder cavity through the annular end wall. The cavity and chamber are fluid-filled, and the piston rod is sealed to the first end wall which is normally above the second end wall.

Known shock absorbers of the afore-described type are equipped with valves near the second end wall which permit liquid flow between the cavity and the chamber as needed when the piston rod moves into and out of the cylinder. The chamber is partly filled with air and communicates with the atmosphere. The valves are relatively complex, therefore costly and a source of malfunction. Moreover, they occupy a significant axial portion of the shock absorber which is not otherwise useful, and thereby require a generally undesirable overall lengthening of the device.

In another known shock abosrber, the gas in the chamber has a high pressure, and an annular floating piston separates the gas from the oil. The floating piston must be sealed to the shell and to the inner cylinder in sliding engagement, and the engaging walls must be finished with great precision at relatively high cost to ensure a reasonable service life of the piston.

It is a primary object of the instant invention to provide a hydropneumatic shock absorber having the desirable operating characteristics of the known devices described above, but being simpler in its design and capable of being manufactured at lower cost.

The shock absorber of the invention is normally installed with its annular end wall and exposed piston rod above the cylinder and its imperforate end wall. In this position, a gas cushion under a pressure much greater than atmospheric pressure is almost completely confined in the chamber between the cylinder and the outer shell. Liquid almost completely fills the compartments of the cylinder cavity above and below the piston, and fills the remainder of the chamber in direct contact with the gas cushion. The chamber and the compartment of the cylinder cavity below the piston communicate permanently for flow of liquid therebetween without significant throttling effect. The sealing member which engages the piston rod for sealing it to the annular end wall of the cylinder is exposed to the liquid in the cavity.

Figure 2:
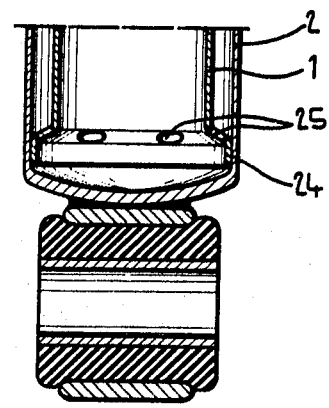
Figure 3:
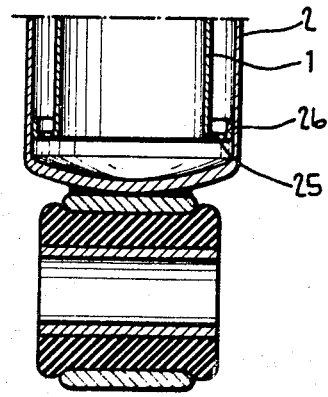

Other features, additional objects, and many of the attendant advantages of this invention will readily be appreciated as the same becomes better understood from consideration of the following detailed description of preferred embodiments when considered in connection with the appended drawing in which:

FIG. 1 shows a hydropneumatic shock absorber of the invention in elevational section on its axis; and FIGS. 2 and 3 show the bottom portions of modified shock absorbers of the invention in views corresponding to that of FIG. 1.

Referring now to the drawing in detail, and initially to FIG. 1, there is seen a hydropneumatic shock absorber having an elongated inner cylinder 1 coaxially received in an outer, cylindrical shell 2 whose diameter is about one third greater than that of the cylinder 1. A piston 3 is axially slidably received in the cylinder cavity 6 and mounted on one end of a piston rod 4 passing axially outward of the cylinder 1 through an annular plug 5 which forms one axial end wall of the cylinder 1 and the shell 2.

A heavy ring 7 is set into the lower end of the cylinder 1. Its annular bottom face 8 is spherically convex and conformingly engages a correspondingly concave face of the imperforate integral bottom wall 9 of the shell 2, thereby holding the cylinder centered in the shell 2. Circumferentially spaced notches 10 in the ring face 8 form radial apertures connecting the cylinder cavity 6 with an annular chamber 11 between the cylinder 1 and the shell 2.

During normal shock absorber operation, the cavity 6 is entirely filled with shock absorber oil or a like liquid which also occupies the lower end of the chamber 11, but has been partly omitted from the drawing for the sake of clarity. The greater upper portion of the chamber 11 is occupied by a cushion 12 of air, nitrogen, or other suitable gas under a pressure much higher than atmospheric pressure in direct contact with the oil in the chamber 11.

The plug 5 is generally of stepped cylindrical shape. Its axially outer or top portion is wide enough to be received in the cylindrical shell 2 with a tight sliding fit. The axially central portion has an outer diameter equal to that of the slightly enlarged top end of the cylinder 1. The lowermost or axially innermost portion of the plug 5 fits into the enlarged top end of the cylinder 1 and is received in the same. A resilient sleeve 13 of oil-resistant synthetic rubber covers the central portion of the plug 5, the enlarged top end of the cylinder 1, and an axially adjacent part of the main portion of the cylinder 1 which is of uniform diameter. The sleeve 13 thereby seals the plug 5 to the cylinder 1. Small radial bores 14 in the last-mentioned part of the cylinder 1 are normally covered and closed by the sleeve 13.

Because the compressed gas cushion 12 is in direct contact with the liquid in the chamber 11, and the chamber is permanently connected with the cylinder cavity 6 through the wide apertures 10, small amounts of gas may enter the cavity and form a temporary gas bubble 15 at the highest point of the cylinder cavity adjacent the bores 14. When the pressure within the cylinder cavity exceeds that in the chamber 11, the gas lifts the sleeve 13 sufficiently from the orifices of the bores 14 to permit its return to the chamber 11 whereas gas from the chamber cannot enter the cylinder cavity, the sleeve 13 serving also as a check valve.

An annular baffle disc 16 is set into the cylinder cavity 6 in an axial position below the lowest limit of the gas bubble 15 that is expected during operation of the shock absorber. The baffle 16 envelops the piston rod 14 with a wide clearance so as not to interfere with axial fluid flow. It is axially aligned with the orifices of axial, valved throttling passages 17 provided in the piston 3 in a conventional manner. Jets of liquid discharged from the passages 17 during downward movement of the piston 3 impinge on the baffle 16 and are prevented from intimately mixing with the gas in the bubble 15, and thereby from forming a foam or froth which would reduce the effectiveness of the shock absorber.

Leakage of fluid from the cylinder cavity along the piston rod 14 is prevented by a sealing ring 18 recessed in the plug 5, but exposed to the pressure fluid in the cylinder cavity.

A fluid-tight seal between the plug 5 and the shell 2 is formed by an O-ring 19 set into an annular groove 20 of the widest plug portion. The upper wall of the groove is approximately conical so that the fluid pressure in the shock absorber wedges the O-ring between the shell 2 and the plug 5.

A sheet metal ring 21 attached to the outer face of the shell 2 and a portion 22 of the vehicle frame, not otherwise shown, provide abutments for an interposed helical compression spring 23 coaxial with the shock absorber and conventional in itself. The threaded outer end 27 of the piston rod 4 and a ring 28 fixedly fastened to the bottom wall 9 of the shell 2 provide attachments for the sprung and unsprung masses of the vehicle. A cap 29 holds the plug 5 in place.

The afore-described shock absorber operates as follows:

When the static or dynamic load on the shock absorber increases, the piston rod 4 moves inward of the cavity 6, and oil flows upward through the throttling passages 17, thereby damping the piston rod movement. The amount of liquid displaced by the entering portion of the piston rod 4 flows through the apertures 10 from the cavity 6 into the chamber 11 against the resilient resistance of the gas cushion 12 which increases as the cushion is being compressed. During inward movement of the piston rod 4, the fluid pressure in the chamber 11 is higher than in the upper compartment of the cavity 6 downwardly bounded by the piston 3, and the check valve at the sleeve 13 remains closed.

When the load on the shock absorber is reduced, and the piston rod 4 moves axially outward of the cavity 6 at a speed partly determined by the throttling effect of the passages 17. The gas cushion 12 expands and drives oil into the cavity 6 to replace the volume of the piston rod portion withdrawn from the cylinder 1. As long as the piston rod 4 moves outwardly of the cavity 6, the fluid pressure in the upper cylinder compartment is greater than in the chamber 11, and the accumulated gas bubble 15 can return to the chamber 11 through the bores 14 and the opened check valve of the sleeve 13. Not enough gas can accumulate in the cavity 6 to reach below the baffle ring 16 where it may be exposed to turbulent liquid flow of sufficient energy to disperse the liquid in a foam.

FIGS. 2 and 3 illustrate modified simple arrangements for holding the lower end of the cylinder 1 coaxially centered in the shell 2. As shown in FIG. 2, the lower terminal portion 24 of the cylinder 1 is enlarged for sliding fit in the shell 2. The frustoconically tapering flange part of the cylinder 1 which connects the enlarged cylindrical portion 24 to the uniformly cylindrical main portion downwardly bounds the chamber 11 and is formed with circumferentially distributed apertures 25 which permit oil to flow between the cavity 6 and the chamber 11 without significant throttling effect, the combined flow sections of the apertures 25 being much greater than the effective flow sections of the passages 17 not all of which are opened simultaneously by their respective valves, as is known in itself.

In the modified shock absorber partly seen in FIG. 3, the lower end of the cylinder 1 is bent over outwardly twice at right angles so as to form a rimmed radial flange 26, the cylindrical rim engaging the inner wall of the shell 2, and the radial flange portion downwardly bounding the chamber 11 and being formed with apertures 25, as described with reference to FIG. 2.

The shock absorbers of the invention have been found to function smoothly and to have entirely satisfactory characteristics although they are quickly assembled from few and simple components and can be manufactured at relatively low cost. The only valves employed are the simple, conventional flap valves on the throttling passages 17 in the piston 3, and the check valve at the sleeve 13 for gas removal from the cavity 6 which additionally serves other functions. It is not necessary to separate the liquid and gas in the shock absorber of the invention by a floating piston which is customary in similar conventional devices and is a source of shock absorber failure if its sealing rings are worn.

The shock absorbers of the invention are installed with the piston rod 4 projecting upwardly from the shell 2 as is preferred in many applications, as with a spring 23 interposed between the vehicle frame and the outer shock absorber shell 2.

While a relatively large gas bubble 15 has been shown in FIG. 1 for the clarity of pictorial representation, the amount of gas which can accumulate at the top of the cavity 6 under all practical operating conditions is so small that the sealing ring 18 is wetted with oil at all times, and the seal between the ring 18 and the piston rod 4 need only be liquid-tight, not gas-tight. Leakage losses from the shock absorber, if any, can be made up by forcing gas or oil under pressure from the outside past the O-ring 19.

In the absence of valves at the lower end of the cylinder 1, it is very simple to keep the lower cylinder end coaxially centered in the shell 2, and the arrangements shown in the several Figures are merely illustrative of convenient solutions to a problem which may be complex in conventional shock absorbers of the hydropneumatic type. The dished bottom wall 9 of the shell 2 serves as a baffle which prevents liquid from entering the chamber 11 at a velocity sufficient to cause dispersion of the compressed gas in the liquid.

If further simplification of the shock absorber is desired, the valve bores 14 may be replaced by notches made in the upper rim of the cylinder 1 and normally covered by the sleeve 13. The plug 5 is modified accordingly to provide passages from the notches to the topmost portion of the cavity 6.

Other modifications and variations will readily suggest themselves to those skilled in the art on the basis of the above teachings, and it should be understood therefore that the invention may be carried out otherwise than specifically disclosed without departing from the spirit and scope of the appended claims.

What is claimed is:

1. A hydropneumatic shock absorber comprising, in combination:
   a. an outer shell member and an inner cylinder member elongated in a common direction,
      1. said cylinder member having a longitudinal axis and being received in said shell member,
      2. said members defining an annular chamber therebetween;
   b. a first annular end wall and a second imperforate end wall axially bounding said chamber and a cavity in said cylinder member;
   c. a piston member axially slidable in said cavity and axially dividing the same into a first compartment adjacent said first end wall and a second compartment adjacent said second end wall,
      1. said piston member being formed with a throttling passage having respective orifices in said compartments for flow of fluid between said compartments;
   d. a piston rod member attached to said piston member and extending therefrom through said first compartment and outward of said cavity;
   e. sealing means sealing said piston rod member to said first end wall,
      1. the first end wall being upwardly spaced from said second end wall in the normal operating position of said shock absorber;
   f. connecting means defining a permanently open connecting conduit between said chamber and said second compartment for flow of fluid therebetween;
   g. a gas under a pressure substantially greater than atmospheric pressure substantially confined in said chamber adjacent said first end wall in said operating position of the shock absorber;
   h. a liquid substantially completely filling said compartments, said passage, and said conduit, and filling the remainder of said chamber in direct contact with said gas in said operating position of the shock absorber;
   i. check valve means connecting a portion of said first compartment axially adjacent said first end wall and radially remote from said piston rod with said chamber for permitting flow of fluid toward said chamber only;
   j. an annular baffle member arranged in said first compartment axially intermediate said check valve means and said piston member in axial alignment with an orifice of said throttling passage in said first compartment,
      1. said cylinder member being formed with an opening connecting said first compartment with said chamber and having an orifice in said chamber adjacent said first end wall,
      2. said check valve means including a resilient sleeve member on said cylinder member and normally covering said orifice,
      3. said first end wall having an axially terminal portion conformingly received in an end portion of said cylinder member, and
      4. said first end wall having another axial portion contiguous to said terminal portion and projecting from said cylinder member in an axial direction.

2. In a shock absorber as set forth in claim 1, said baffle member having a central opening receiving said piston rod member with sufficient clearance to permit unimpeded passage of fluid between said baffle member and said piston rod member.

3. A shock absorber as set forth in claim 1, wherein the resistance of said connecting means to flow of said liquid therethrough between said chamber and said second compartment is much smaller than the resistance of said piston member to axial flow between said compartments.

4. In a shock absorber as set forth in claim 1, locating means substantially centering the terminal portion of said cylinder member adjacent said second end wall in said shell member, whereby said cavity is annular about said axis.

5. In a shock absorber as set forth in claim 4, said locating means including a ring member mounted on said cylinder member, said second end wall being of arcuate cross section and conformingly engaging said ring member.

6. In a shock absorber as set forth in claim 4, said locating means including a flange radially extending from said cylinder member and engaging said shell member.

7. In a shock absorber as set forth in claim 1, the cross section of said other axial portion being substantially the same as the cross section of the end portion of said cylinder member, said sleeve member enveloping said other axial portion and said end portion for sealing said first end wall to the cylinder member.

8. In a shock absorber as set forth in claim 7, said cylinder member having an axial part contiguously adjacent said end portion and formed with said opening, said axial part being of smaller cross section than said end portion.

* * * * *